United States Patent [19]
Pare, Jr. et al.

[11] Patent Number: 5,802,199
[45] Date of Patent: Sep. 1, 1998

[54] USE SENSITIVE IDENTIFICATION SYSTEM

[75] Inventors: David Ferrin Pare, Jr.; Ned Hoffman; Jonathan Alexander Lee, all of Berkeley, Calif.

[73] Assignee: SmartTouch, LLC, Berkeley, Calif.

[21] Appl. No.: 818,872

[22] Filed: Mar. 17, 1997

Related U.S. Application Data

[63] Continuation-in-part of Ser. No. 442,895, May 17, 1995, Pat. No. 5,613,012, which is a continuation-in-part of Ser. No. 345,523, Nov. 28, 1994, Pat. No. 5,615,277.

[51] Int. Cl.$^6$ ................................................. G06K 9/00
[52] U.S. Cl. ..................................... 382/115; 382/224
[58] Field of Search ........................ 340/825.34, 825.33, 340/825.31; 395/244, 241, 243; 380/21, 24; 902/26, 1, 2, 3, 4, 5, 6, 8, 9, 10, 12, 13, 22, 23, 24, 25, 27; 235/380, 375, 376, 379, 381, 382, 383, 382.5, 384, 385, 386; 382/115, 116, 117, 118, 119, 124, 128, 181, 190, 209

[56] References Cited

U.S. PATENT DOCUMENTS

| | | | |
|---|---|---|---|
| 4,821,118 | 4/1989 | Lafreniere | 358/108 |
| 4,837,422 | 6/1989 | Dethloff et al. | 364/408 |
| 4,961,142 | 10/1990 | Elliott et al. | 364/408 |
| 4,993,068 | 2/1991 | Piosenka et al. | 380/23 |
| 4,995,086 | 2/1991 | Lilley et al. | 382/4 |
| 4,998,279 | 3/1991 | Weiss | 340/825 |

(List continued on next page.)

OTHER PUBLICATIONS

Security Management V 37, n11 (Nov. 1993):17–19 Anderson, et al., American Society of Industrial Security "Security Works", Senior Editor Harowitz, Arlington, VA.

*Primary Examiner*—Leo Boudreau
*Assistant Examiner*—Bijan Tadayon
*Attorney, Agent, or Firm*—Ali Kamarei

[57] ABSTRACT

The system includes a master computer having a master computer comparator. The master computer comparator further having a master user biometric database which contains or stores the biometric samples of all users registered with the identification computer system. The master computer further includes a user personal identification code group database which contains the personal identification codes of said users. The identification computer system further includes at least two local computers which are physically remote from each other. Each local computer further includes a biometric scanner; a local comparator; a data entry device; and a local user biometric database containing a subset of the biometric samples contained in the master biometric database. First interconnectors that interconnects each local computer to the master computer. When the user enters their bid biometric sample and bid personal identification code into a first local computer, the first local computer comparator compares the bid biometric sample and bid personal identification code against biometric samples and personal identification codes contained in the first local computer database to produce either a failed or successful first identification result. If the first local computer returns a failed identification result, the bid biometric sample and bid personal identification code are transmitted to the master computer for comparison of the entered bid biometric sample and bid personal identification code to personal identification codes and biometric samples stored in the master computer for producing either a failed or successful second identification result. The result of the first or second identification result is externalized from the identification computer system or displayed to the user by a display unit.

21 Claims, 10 Drawing Sheets

U.S. PATENT DOCUMENTS

| | | | |
|---|---|---|---|
| 5,036,461 | 7/1991 | Elliott et al. | 364/408 |
| 5,054,089 | 10/1991 | Uchida et al. | 382/4 |
| 5,095,194 | 3/1992 | Barbanell | 235/379 |
| 5,109,427 | 4/1992 | Yang | 382/4 |
| 5,109,428 | 4/1992 | Igaki et al. | 382/5 |
| 5,144,680 | 9/1992 | Kobayashi et al. | 382/4 |
| 5,146,102 | 9/1992 | Higuchi et al. | 250/556 |
| 5,168,520 | 12/1992 | Weiss | 380/23 |
| 5,180,901 | 1/1993 | Hiramatsu | 235/380 |
| 5,191,611 | 3/1993 | Lang | 380/25 |
| 5,210,588 | 5/1993 | Lee | 356/71 |
| 5,210,979 | 5/1993 | Usui et al. | 382/4 |
| 5,222,152 | 6/1993 | Fishbine et al. | 382/2 |
| 5,229,764 | 7/1993 | Matchett et al. | 340/825.34 |
| 5,230,025 | 7/1993 | Fisfbine et al. | 382/4 |
| 5,239,583 | 8/1993 | Parrillo | 380/23 |
| 5,241,606 | 8/1993 | Horie | 382/4 |
| 5,251,259 | 10/1993 | Mosley | 380/23 |
| 5,265,162 | 11/1993 | Bush et al. | 380/24 |
| 5,276,314 | 1/1994 | Martino et al. | 235/380 |
| 5,280,527 | 1/1994 | Gullman et al. | 380/23 |
| 5,321,242 | 6/1994 | Heath, Jr. | 235/382 |
| 5,325,442 | 6/1994 | Knapp | 382/4 |
| 5,335,288 | 8/1994 | Faulkner | 381/2 |
| 5,343,529 | 8/1994 | Goldfine et al. | 380/23 |
| 5,351,303 | 9/1994 | Willmore | 382/4 |

USE SENSITIVE IDENTIFICATION SYSTEM

CROSS-REFERENCE

The present application is a continuation-in-part of U.S. patent application Ser. No. 08/442,895, filed May 17, 1995 now U.S. Pat. No. 5,613,012, which is continuation-in-part of U.S. patent application Ser. No. 08/345,523, filed Nov. 28, 1994 now U.S. Pat. No. 5,615,277 which are incorporated herein by reference.

BACKGROUND

The use of tokens and credit cards in today's financial world is pervasive. A token would be any inanimate object which confers a capability to the individual presenting the object. Remote access of every financial account is through the use of tokens or plastic cards. Whether buying groceries with debit cards or consumer goods with credit cards, at the heart of that transaction is a money transfer enabled by a token, which acts to identify an individual and the financial account he is accessing. Unfortunately, current technology in combination with this convenient token-based money transfer system results in a system that is prone to theft and fraud.

As verification of user identity is based solely on data placed on the token, which can be easily reproduced and transferred between individuals, such security must rely on both the diligence and the luck of the authorized user and merchant in maintaining this information as proprietary. However, by their very nature, tokens do not have a very strong connection with the individual. Identification of the rightful owner of the token through the token is tenuous at best. This is easily demonstrated by the fact that individuals other than the rightful owners of the tokens have been using these tokens to defraud merchants and other consumer goods suppliers.

Fraud losses in the credit card industry stem from many different areas due to the highly vulnerable nature of the system, but they are mainly due to either lost, stolen, or counterfeit cards. Credit cards operate without the use of a personal identification code (PIC), therefore a lost credit card can be turned into cash if the card falls into the wrong hands. While theft of a token constitutes the majority of fraud in the system, the use of counterfeit credit cards has been on the rise. Counterfeit credit cards are manufactured by a more technically sophisticated criminal by acquiring a cardholder's valid account number and then producing a counterfeit card using that valid number. Another form of loss is by a criminal merchant who surreptitiously obtains the cardholder's account number. Yet another type of fraud is committed by the authorized cardholder when the token is used for making purchases and thereafter a claim is made that the token was either lost or stolen. It is estimated that losses due to all types of fraud exceeds $950 million dollars annually.

Generally, debit cards are used in conjunction with a personal identification code (PIC). Counterfeiting a debit card is more difficult as the criminal must acquire not only the account number, but also the PIC, and then manufacture the card as in the credit card example. However, various strategies have been used to obtain PICs from unwary cardholders; these range from Trojan horse automated teller machines, or ATMs, in shopping malls that dispense cash but record the PIC, to merchant point of sale devices that also record the PIC, to individuals with binoculars that watch cardholders enter PICs at ATMs.

Card blanks are manufactured under very tight security. Then they are individualized with the account number, expiration date, and are then mailed to the cardholder. Manufacturing and distributing the card alone costs the industry approximately one billion dollars annually. The standard card costs the financial industry $2 for each, but only $0.30 of this $2 is associated with actual manufacturing cost.

In the near future, the banking industry expects to move to an even more expensive card, called a "smart card". Smart cards contain as much computing power as did some of the first home computers. Current cost projections for a first-generation smart card is estimated at approximately $3.50, not including distribution costs, which is significantly higher than the $0.30 plastic card blank.

This significant increase in cost has forced the industry to look for new ways of using the power in the smart card in addition to simple transaction authorization. It is envisioned that in addition to storing credit and debit account numbers, smart cards may also store phone numbers, frequent flyer miles, coupons obtained from stores, a transaction history, electronic cash usable at tollbooths and on public transit systems, as well as the customer's name, vital statistics, and perhaps even medical records. Clearly, the financial industry trend is to further establish use of tokens.

Unfortunately, because of the projected concentration of functions onto the smart card, the cardholder is left more vulnerable to the loss or destruction of the card itself. Thus, after spending vast sums of money, the resulting system will be more secure, but threatens to levy heavier and heavier penalties for destruction or loss of this card on the consumer.

In addition to and associated with the pervasiveness of electronic financial transactions, there is now the widespread use of electronic facsimiles, electronic mail messages and similar electronic communications. Similar to the problem of lack of proper identification of individuals for financial transactions is the problem of lack of proper identification of individuals for electronic transmissions. The ease and speed of electronic communication, and its low cost compared to conventional mail, has made it a method of choice for communication between individuals and businesses alike. This type of communication has expanded greatly and is expected to continue to expand. However, millions of electronic messages such as facsimiles and electronic mail (or "E-mail" or "email") messages are sent without knowing whether they arrive at their true destination or whether a certain individual actually sent or received that electronic message. Furthermore, there is no way to verify the identify the individual who sent or who received an electronic message.

More recently, some have turned their attention from the use of personal identification codes to the use of unique biometrics as the basis of identity verification, and ultimately computer access. In this approach, authenticated biometrics are recorded from a user of known identity and stored for future reference on a token. In every subsequent access attempt, the user is required to enter physically the requested biometrics, which are then compared to the authenticated biometrics on the token to determine if the two match in order to verify user identity. Because the biometrics are uniquely personal to the user and because the act of physically entering the biometrics are virtually irreproducible, a match is putative of actual identity, thereby decreasing the risk of fraud.

Various biometrics have been suggested, such as finger prints, hand prints, voice prints, retinal images, handwriting samples and the like. However, because the biometrics are generally stored in electronic (and thus reproducible) form on a token and because the comparison and verification process is not isolated from the hardware and software directly used by the individual attempting access, a significant risk of fraudulent access still exists. Examples of this approach to system security are described in U.S. Pat. No. 4,821,118 to Lafreniere; U.S. Pat. No. 4,993,068 to Piosenka et al.; U.S. Pat. No. 4,995,086 to Lilley et al.; U.S. Pat. No. 5,054,089 to Uchida et al.; U.S. Pat. No. 5,095,194 to Barbanell; U.S. Pat. No. 5,109,427 to Yang; U.S. Pat. No. 5,109,428 to Igaki et al.; U.S. Pat. No. 5,144,680 to Kobayashi et al.; U.S. Pat. No. 5,146,102 to Higuchi et al.; U.S. Pat. No. 5,180,901 to Hiramatsu; U.S. Pat. No. 5,210,588 to Lee; U.S. Pat. No. 5,210,797 to Usui et al.; U.S. Pat. No. 5,222,152 to Fishbine et al.; U.S. Pat. No. 5,230,025 to Fishbine et al.; U.S. Pat. No. 5,241,606 to Horie; U.S. Pat. No. 5,265,162 to Bush et al.; U.S. Pat. No. 5,321,242 to Heath, Jr.; U.S. Pat. No. 5,325,442 to Knapp; U.S. Pat. No. 5,351,303 to Willmore, and U.S. Pat. No. 5,229,764 to Matchett, all of which are incorporated herein by reference.

Almost uniformly, patents that disclose token-based systems teach away from biometrics recognition without the use of tokens. Reasons cited for such teachings range from storage requirements for biometrics recognition systems to significant time lapses in identification of a large number of individuals, even for the most powerful computers.

In view of the foregoing, there has long been a need for a computer access system that is highly fraud-resistant, practical, and efficient for the user to operate and carry out electronic transactions and transmissions within commercially acceptable time frames. There is also a need for an identification system that is responsive and sensitive to use or lack of use.

There is also a need for a computer system that is tokenless and that is capable of verifying a user's personal identity, based solely upon a personal identification code and biometrics that is unique and physically personal to an authorized user, as opposed to verifying an individual's possession of any physical objects that can be freely transferred between different individuals. Such biometrics must be easily and non-intrusively obtained; must be easy and cost-effective to store and to analyze; and must not unduly invade the user's privacy rights.

SUMMARY

The present invention satisfies these needs by providing an identification computer system that is sensitive to use or lack of use, for determining an individual's identity from comparison of previously recorded biometric samples and personal identification codes with a bid biometric sample and a bid identification code. The system comprises a master computer having a master computer comparator. The master computer comparator further having a master user biometric database which contains or stores the biometric samples of all users registered with the identification computer system. The master computer further comprises a user personal identification code group database which contains the personal identification codes of said users. In alternative embodiments, the personal identification codes of users may either be unique or are not unique to the individual users. In systems registering large numbers of users, where biometric identification processes are time consuming, it is preferable that a non-unique personal identification code/biometric basket mechanism be used. The identification computer system further comprises at least two local computers which are physically remote from each other. Each local computer further comprises a biometric scanner; a local comparator; a data entry device; and a local user biometric database containing a subset of the biometric samples contained in the master biometric database. A first interconnector interconnects each local computer to the master computer.

When the user enters their bid biometric sample and bid personal identification code into a first local computer, the first local computer comparator compares the bid biometric sample and bid personal identification code against biometric samples and personal identification codes contained in the first local computer databases to produce either a failed or successful first identification result. If the first local computer returns a failed identification result, the bid biometric sample and bid personal identification code are transmitted to the master computer for comparison of the entered bid biometric sample and bid personal identification code to the personal identification codes and biometric samples stored in the master computer for producing either a failed or successful second identification result. The result of the first or second identification result is externalized from the identification computer system or displayed to the user by a display unit.

Upon return of a failed first identification result and return of a successful second identification result, the master computer transmits the biometric sample and personal identification code of the identified user to the first local computer for storage in the local computer personal identification code and local computer biometric sample databases. Therefore, in future identification requests, where bid biometric samples of the same individual is presented to the local computer, only the biometric sample database of the first local computer need be searched.

In another embodiment of the invention the identification computer system further comprises a purge engine for deleting biometric samples and personal identification codes from the master computer and local computer database. In order to store only biometric samples from those individuals who use the system more often and to prevent the overload of biometric sample database with biometric samples from individuals who do not use the system often or use the local computers sparsely, the personal identification code and biometric sample of a user is deleted from the local computer biometric database if there has been no attempt to identify an individual upon expiration of a predetermined time limit. Otherwise, the purge engine is also used by a system administrator to delete unwanted biometric sample and personal identification code samples from either the master computer or local computer database.

The local computers further comprise at least one terminal apparatus that is functionally partially or fully integrated with the biometric scanner; at least one code entry pad; and second interconnector that interconnects the biometric scanner, terminal apparatus and the code entry pad.

In order to make communications between the master computer and the local computers more safe, the identification computer system further comprises encryption and decryption means, wherein communications between the master computer and local computers are encrypted. In another embodiment of the invention the local computers are connected to each other by third interconnecting means such as an ATM network, the Internet, a private intranet, a telephone network, or a cable TV network.

In another embodiment of the invention, the identification computer system further comprises a fraud detector engine further comprising a fraud biometric comparator and fraud biometric data bases containing a subset of the biometric samples stored in the master computer. The biometric samples of individuals who have previously attempted fraud upon the identification computer system are stored within the fraud biometric database. Thereafter, the biometric samples of those who are registering with the system are compared against the biometric samples in the fraud biometric sample database to screen for repeat fraud attempts.

Another embodiment of the invention comprises an identification computer system authenticator wherein a private code, distinct from the personal identification code and not used to gain access to the computer system, is previously gathered from the user and recorded in the master computer data bases, and is presented to only the user after an identification attempt, whereby the user is assured that the authentic computer system was used to process the account access because a false computer system would not be able to present the customer's private code.

In another configuration of the invention, an identification computer system that is sensitive to use or lack of use, is used for determining an individual's identity from comparison of previously registered biometric samples and personal identification codes with a bid biometric sample and a bid identification code. The system comprises a master computer further having a master computer comparator, a master user biometric database containing the biometric samples of all users registered with the computer system, and a user personal identification code group database containing the personal identification codes of said users. In alternative embodiments, the personal identification codes of users may either be unique or not unique to the users.

There are at least two local computers, physically remote from each other, each local computer further comprising; a biometric scanner; a local comparator; a data entry device; and a local user biometric database containing a subset of the biometric samples contained in the master biometric database. At least two intermediary computers are also used, each having an intermediary computer comparator, intermediary computer user biometric samples containing a subset of biometric samples than the master computer biometric sample database, and a different subset of biometric sample database contained in the local computer biometric sample database, and a user personal identification code group database containing the personal identification codes of said users; wherein the personal identification codes of users are not unique to the users. First interconnecting means interconnect each local computer with only one intermediary computer, and second interconnecting means interconnects each intermediary computer to the master computer.

When the user enters their bid biometric sample and bid personal identification code into a first local computer, the first local computer comparator compares the bid biometric sample and bid personal identification code with biometric samples and personal identification codes contained in the first local computer for producing either a failed or successful first identification result. If the first local computer returns a failed identification result, the bid biometric sample and bid personal identification code are transmitted to the intermediary computer it is connected to, for comparison of the entered bid biometric sample and bid personal identification code to the personal identification codes and biometric samples stored in the intermediary computer for producing either a failed or successful second identification result. If the intermediary computer returns a failed identification result, the bid biometric sample and bid personal identification code are transmitted to the master computer for comparison of the entered bid biometric sample and bid personal identification code to personal identification codes and biometric samples stored in the master computer for producing either a failed or successful third identification result. Finally, the first, second or third identification result is externalized from the identification computer system suing a display unit such as a television, monitor, or LED.

In another embodiment of this configuration, upon return of a failed first identification result, and upon return of a successful second identification result, the intermediary computer transmits the biometric sample and personal identification code of the identified user to the local computer for storage.

In a different embodiment of this configuration, upon return of a failed first and second identification results, and upon return of a successful third identification result, the master computer transmits the biometric sample and personal identification code of the identified user to the intermediary computer for storage. Thereafter, the intermediary computer transmits the biometric sample and personal identification code of the identified user to the local computer.

In yet another configuration of the invention, an identification computer system that is sensitive to use or lack of use is used for determining a user's identity from comparison of previously stored biometric samples and personal identification codes with a bid biometric sample and a bid identification code. The system comprises at least two master computers each having a master computer comparator and data bases, wherein each master computer contains a different subset of all biometric samples and personal identification codes of users registered with the identification computer system. At least two local computers, physically remote from each other, and each local computer connected through a first interconnecting means to only one master computer, each local computer containing a subset of the biometric samples and personal identification codes contained in the at least two master computers, and each local computer having a local computer comparator. Second interconnecting means for interconnecting the at least two master computers to each other.

When the user enters their registered bid biometric sample and bid personal identification code into a first local computer, the first local computer comparator compares the bid biometric sample and bid personal identification code with biometric samples and personal identification codes contained in the first local computer for producing either a failed or successful first identification result. If the first local computer returns a failed identification result, the bid biometric sample and bid personal identification code are transmitted to a first master computer for comparison of the entered bid biometric sample and bid personal identification code to personal identification codes and biometric samples stored in the first master computer for producing either a failed or successful second identification result. If the first master computer returns a failed identification result, the first master computer transmits the bid identification code and bid biometric sample to at least one second master computer for comparison of the bid biometric sample and bid personal identification code to the biometric samples and personal identification codes stored in the second master computer for producing a failed or successful third identification result. The result of the first, second, or third identification result is externalized to a display unit.

In a different embodiment, upon return of a failed first identification results, and upon return of a successful second identification result, the first master computer transmits the biometric sample and personal identification code of the identified user to the local computer for storage in the local computer biometric database.

In a different embodiment of this configuration, upon return of a failed first and second identification results, and upon return of a successful third identification result, the second master computer transmits the biometric sample and personal identification code of the identified user to the first master computer for storage. Thereafter, the first master computer transmits the biometric sample and personal identification code of the identified user to the first local computer for storage in the biometric database.

Each master computer has a purge engine. In another embodiment, after the second master computer transmits the biometric sample and personal identification code of the identified user to the first master computer, and preferably receiving confirmation from the first master computer that the biometric sample and personal identification code of the user has been stored, the second master computer uses its purge engine to purge the biometric sample and personal identification code of the identified user from its data bases. Alternatively, or in addition to purging the user's personal identification code from its database, the second master computer purges the user's personal identification code and biometric sample from the intermediary computer it is connected to.

In yet another embodiment, the purge engine deletes the biometric sample and personal identification code of any user from the first local computer or an intermediary computer upon expiration of a predetermined time limit.

An embodiment of the invention provides a method for rapid search of previously stored biometric samples from individuals using at least two biometric baskets, at least one biometric basket containing at least two algorithmically unique biometric samples from different individuals, each biometric basket containing less than the total number of samples registered with the system, and each biometric basket being identified by a personal identification code. The method comprises; a storage step further comprising; gathering a biometric sample from an individual; selecting a personal identification code for the user, the personal identification code indexing a biometric basket; and locating the biometric basket identified by the personal identification code.

The biometric sample gathered from said individual is compared with all previously stored biometric samples in the biometric basket to make sure that the biometric sample gathered from the individual is algorithmically unique from all biometric samples currently stored in said biometric basket. If the registration biometric sample is algorithmically unique, then a successful uniqueness result is returned and the entered biometric sample gathered from said individual is stored in the selected biometric baskets. In a bid step, the candidate individual enters a bid personal identification code and submits a bid biometric sample. Finally, in a comparison the computer locates the biometric basket that is identified by the bid personal identification code entered by said candidate individual; and the entered bid biometric sample of said candidate individual is compared with all of the biometric samples stored in a located biometric basket for producing either a successful or failed identification result.

The invention is markedly advantageous and superior to any existing systems in that the system adapts to use, thereby rapidly responding to use or lack thereof. This is accomplished in two ways. First, the various database in the different locations contain different biometric sample and personal identification code, therefore, every time a bid biometric sample is presented for identification, there is no need to search the entire biometric sample database of those registered with the computer identification system, only those that reside in a particular area. Second, upon non-use or infrequent use, the biometric sample of individuals are purged from the local and intermediary computer databases in order to free up storage space, as well as increasing the speed of the searches since fewer biometric comparisons have to be made.

It is another object of the invention to provide a computer access identification system that is capable of verifying a user's identity, as opposed to verifying possession of proprietary objects and information. It is yet another object of the invention to verify user identity based upon one or more unique characteristics physically personal to the user.

These and other advantages of the invention will become more fully apparent when the following detailed description of the invention is read in conjunction with the accompanying drawings.

DETAILED DESCRIPTION

The main objective of this invention is to provide a method and apparatus for identifying individuals using biometrics, which is sensitive to increased or decreased usage, for example as a result of migration of an individual user from one area to another.

Figure 1:
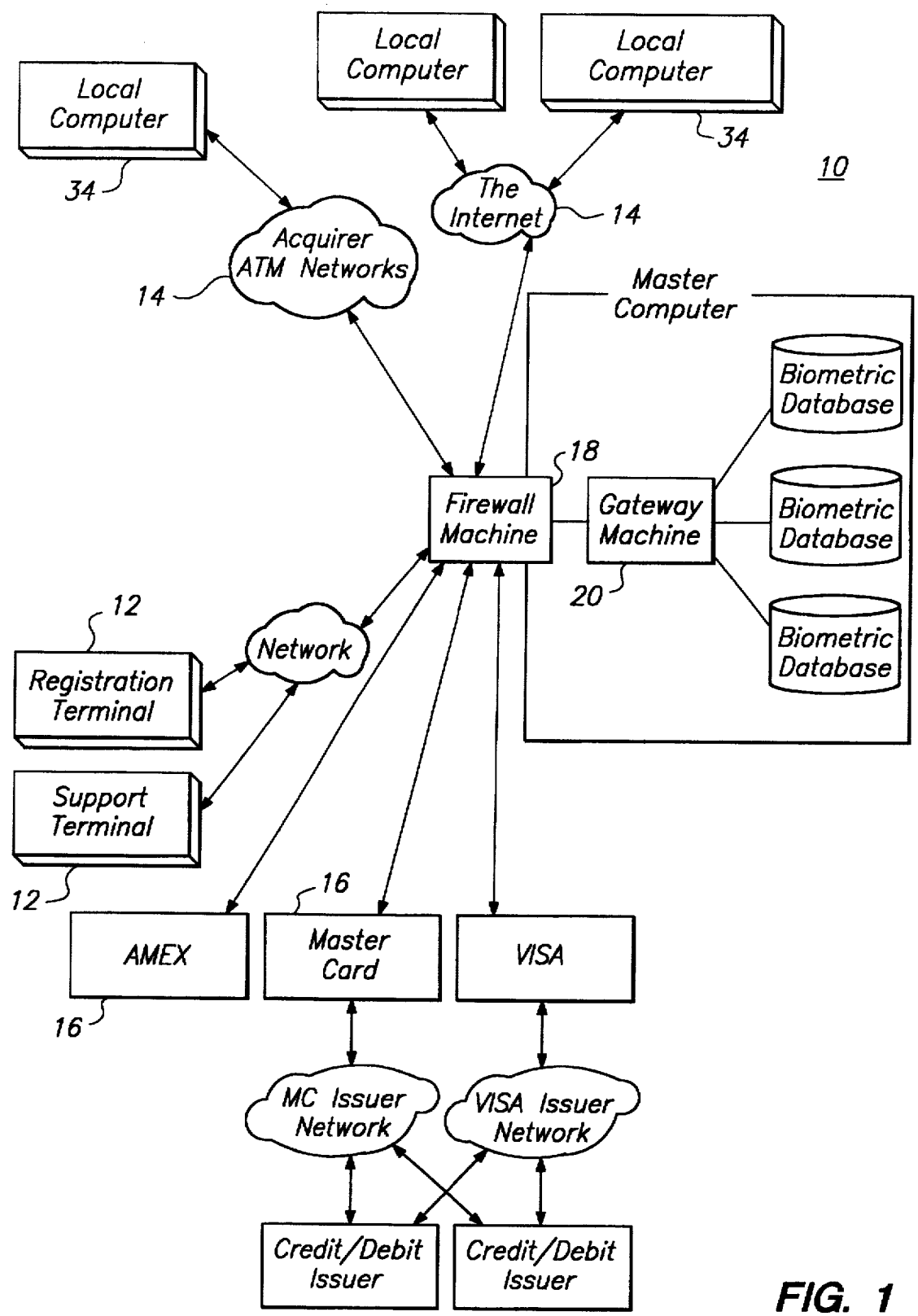
FIG. 1 is an overall diagram of the identification system
Figure 2:
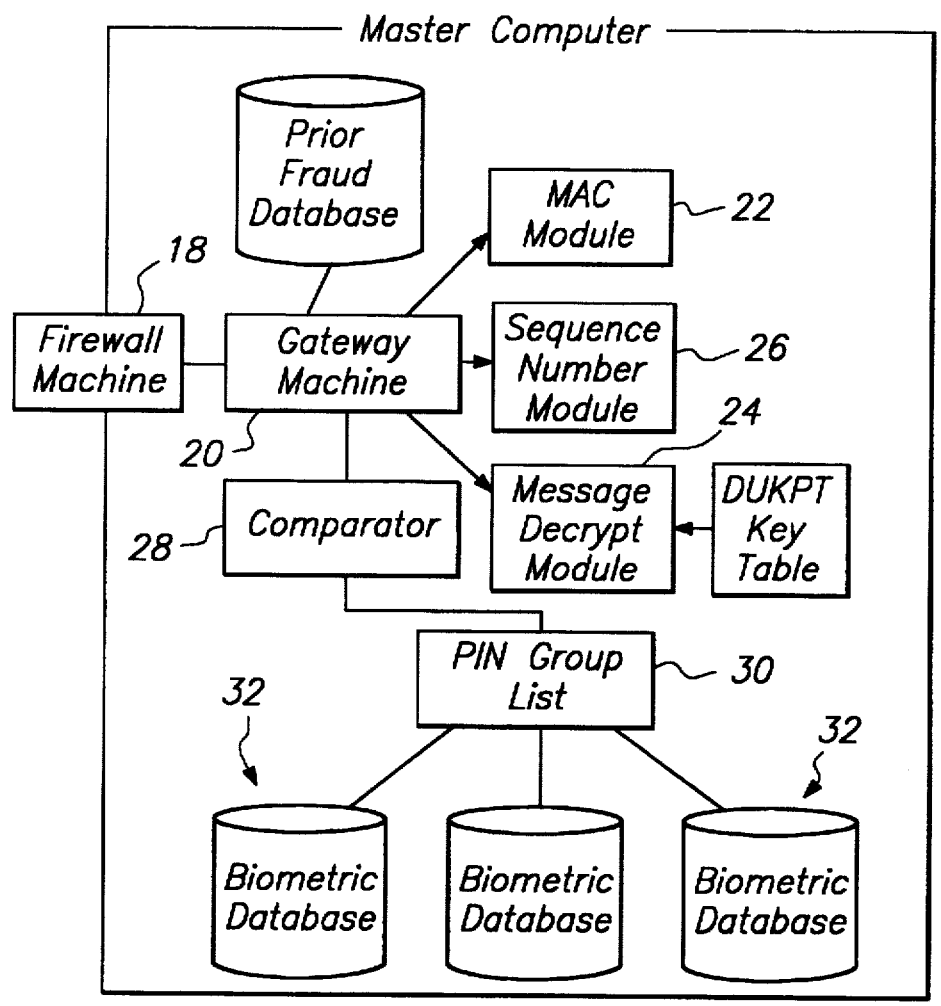
FIG. 2 is a diagram of the master computer (MC), its internal data bases, and execution modules.

Turning now to the figures, the overall configuration and components of the identification computer system are shown in FIG. 1. Essentially a master computer 10 is connected to various local computers 34 through various type of communication means 14. In an embodiment, the local computers 34 and the master computer are also connected to and communicate with independent computer networks 16. The master computer contains several data bases and software execution modules as shown in FIG. 2. In a preferred embodiment of the invention, the data bases are backed up or "mirrored" for safety reasons. The Firewall Machine 18 is responsible for prevention of electronic intrusion of the system while the Gateway Machine 20 carries out all requests from the user, including adding, deleting and otherwise modifying all data bases. The Gateway Machine is also responsible for decryption and de-packaging of data that has arrived from the terminals using the MACM module 22, MDM module 24, and the Serial Number Module 26. The Gateway Machine uses the personal identification group list 30 to locate a biometrics sample basket 31 (not shown) in biometric database 32. Each biometric sample basket 31 is identified by a single personal identification code. In a system which requires registration of large numbers of users, each biometric basket contains multiple biometric samples from different individuals. In a system where a small number of individuals are registered, each personal identification code can be unique to each individual user. Thereafter, comparator 28 performs a comparison of the bid biometric sample with registered biometric samples stored within the biometric sample basket 31.

Figure 3:
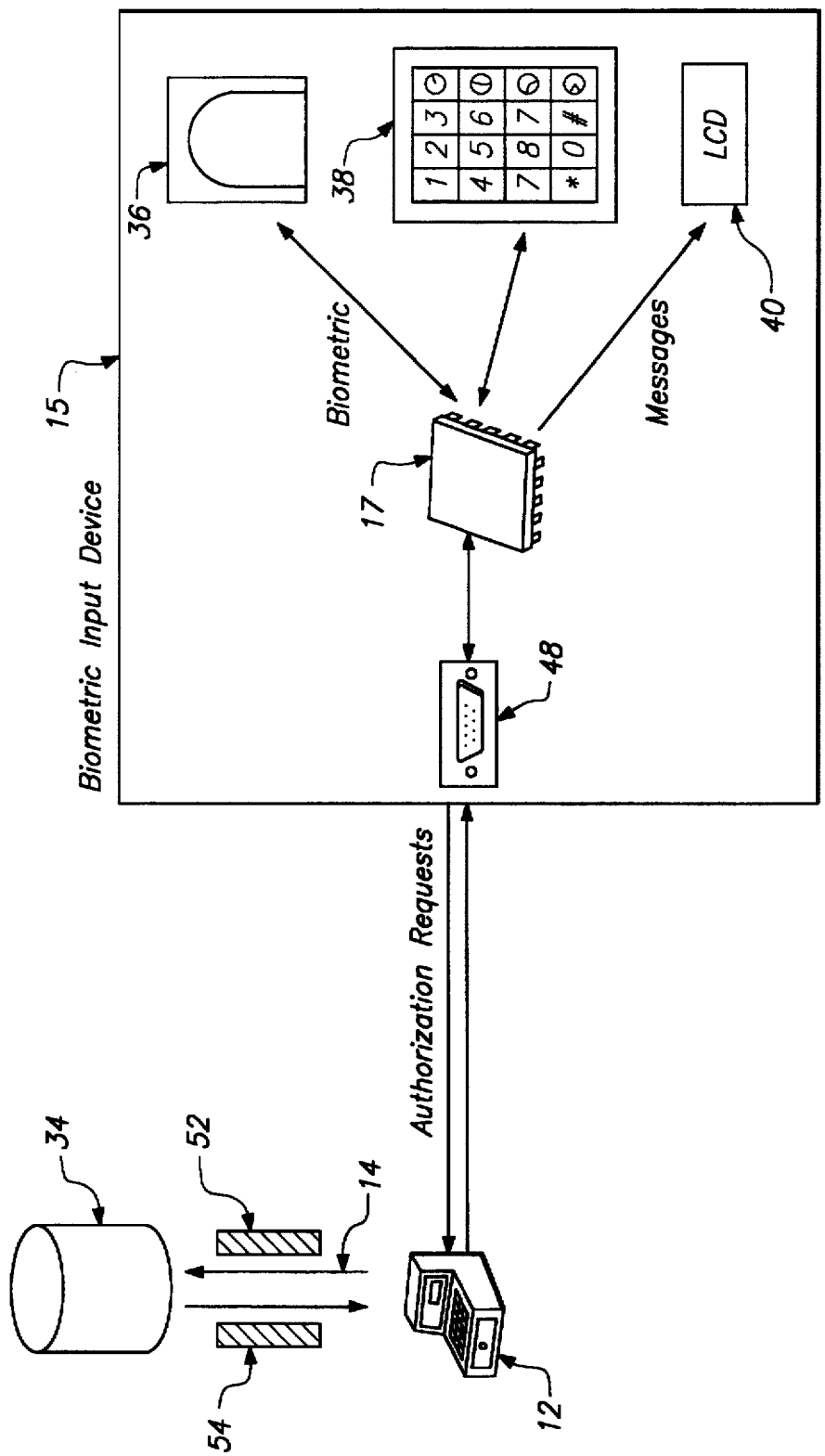
FIG. 3 is a diagram of the biometrics input apparatus device and its components, and the interconnections between them.

FIG. 3 depicts the functional relationship between the terminal 12 a local computer 34, and biometric input device 15. Biometric input device 15 in turn comprises of biometrics scanner 36, data entry key pad or personal identification code or pin pad 38, a display unit 40, and computing module 17. The biometric input apparatus 15 communicates with local computer 34 through request packets 52 and response packets 54 using one of the interconnecting means in FIG. 1 such as cable network, cellular telephone networks, telephone networks, Internet, ATM network, or X.25.

Figure 4:
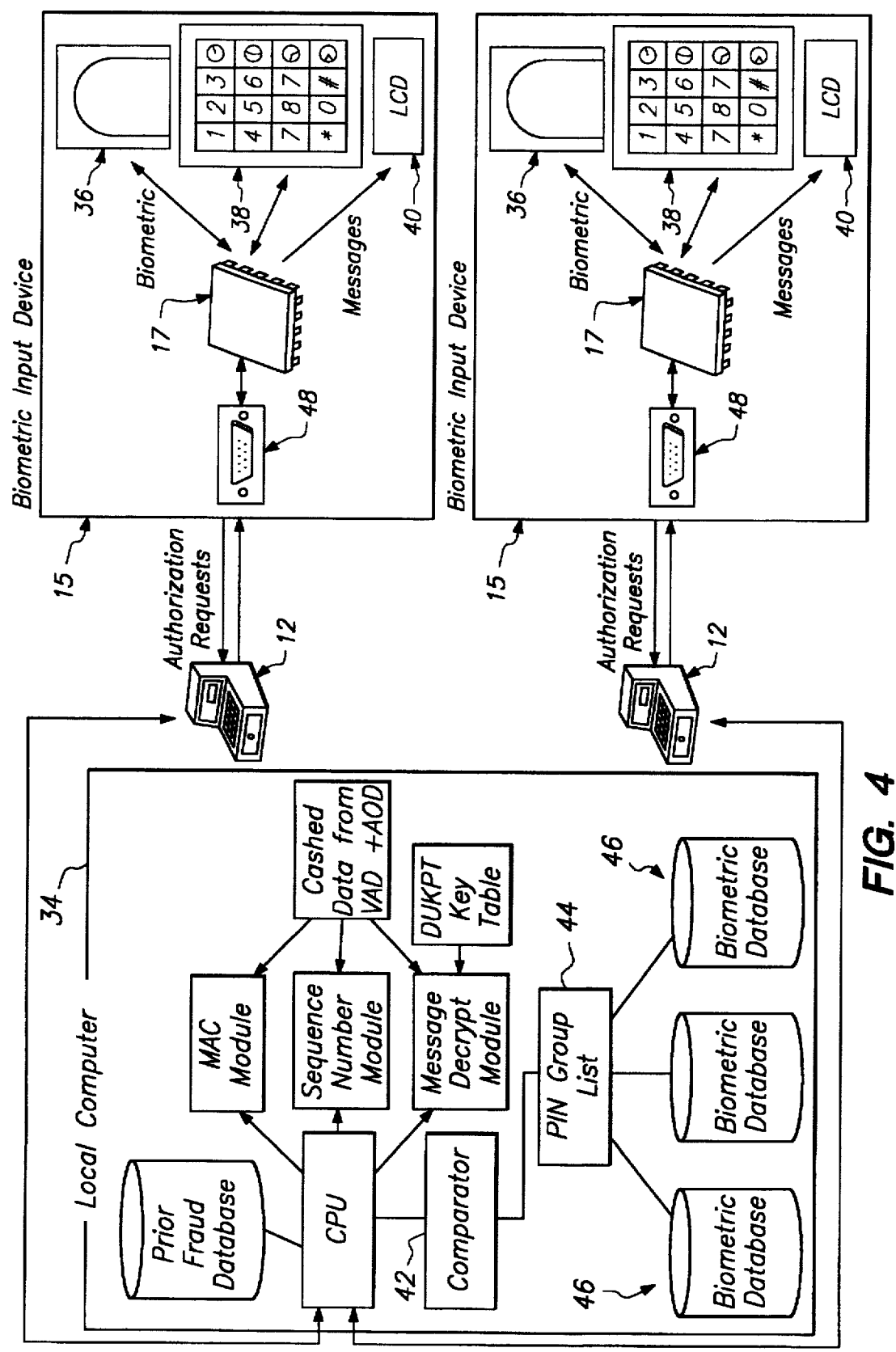
FIG. 4 is a flow chart of the operation of the biometrics input apparatus and the terminal for generating an identification request message.

FIG. 4 is a representational diagram of the overall relationship between local computer 34 and biometric input devices 15. The local computer has a local computer comparator 42, personal identification code group list 44 and individual biometric sample database 46 containing the biometric baskets 47 (not shown). The set of biometric samples contained in the local computer biometric sample database 46 is a subset of the biometric samples contained in the master computer biometric sample database 32. Each local computer has a subset of the biometric samples registered with the identification computer system contained in the master computer database, which each are preferably different from the subset contained in each of the other local computer databases.

Figure 5:
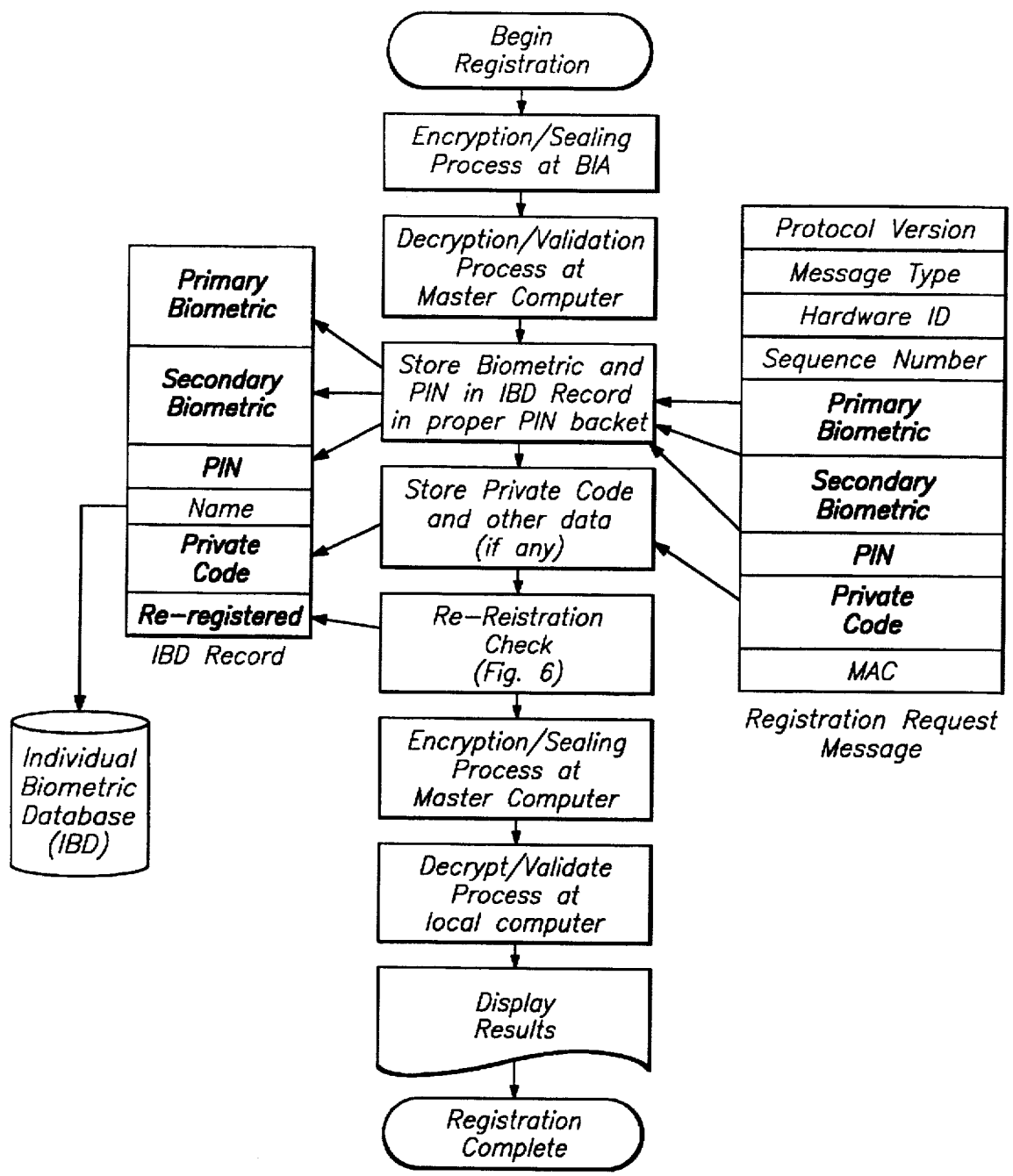
FIG. 5 is a flow chart representing the registration process.
Figure 6:
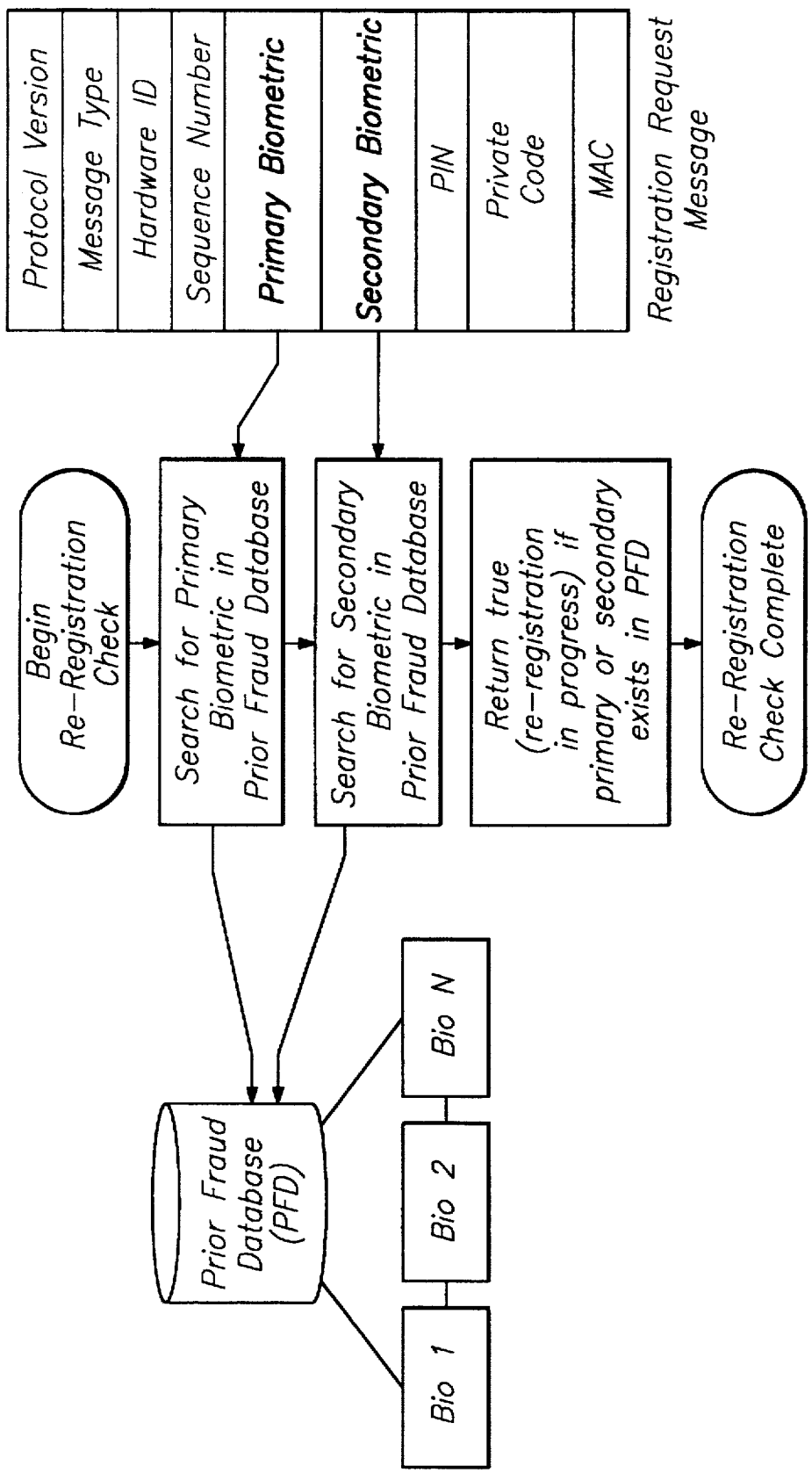
FIG. 6 is a flow chart representing the re-registration process for detecting individuals who have previously committed fraud upon the system.
Figure 7:
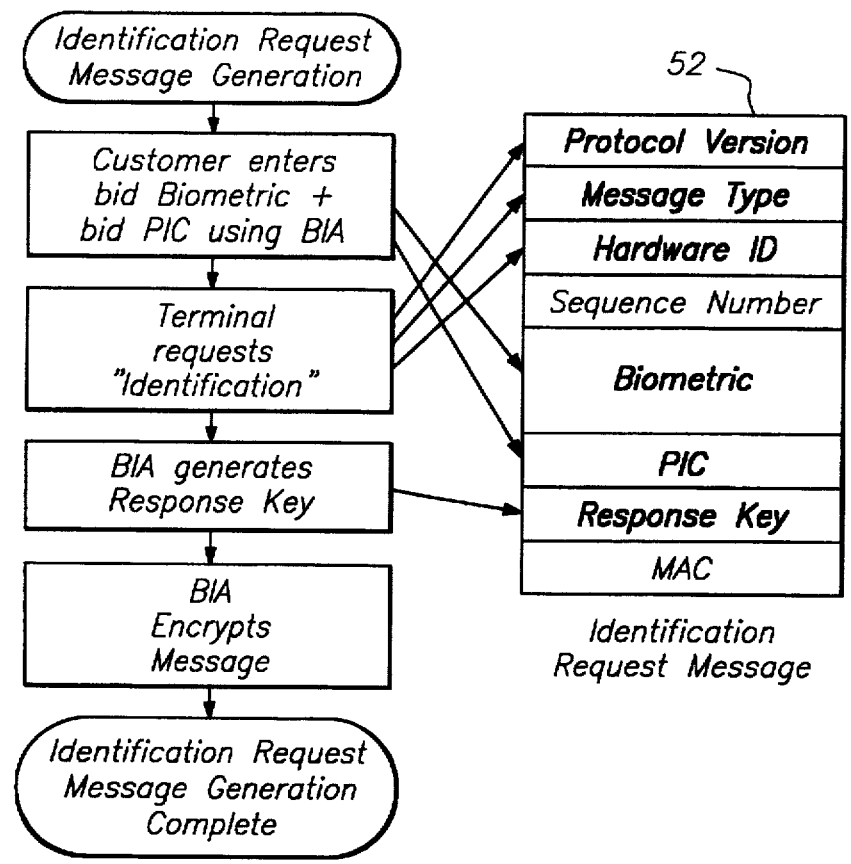
FIG. 7 is a diagram representing the relationship between biometric input devices and apparatus physically remote from each other, and a local computer.

The biometrics scanner 36 can be any one of a finger print scanner, voice scanner, palm print scanner, retinal scanner or the like, although the fingerprint scanner will be used as an example. The biometric input device is further equipped with computing module 17, device drivers, and erasable and non-erasable memory modules. The biometric input apparatus communicates with the terminal through preferably a serial port 48. FIG. 5 shows the registration process for an individual user and FIG. 6 shows a representational diagram of the re-registration check process where a prior-fraud data base is searched to determine if the individual registering with the identification computer system had previously perpetrated fraud upon the system. FIG. 7 shows a representational diagram of an identification request message 52 and its method of generation by the biometric input apparatus 15.

Figure 8:
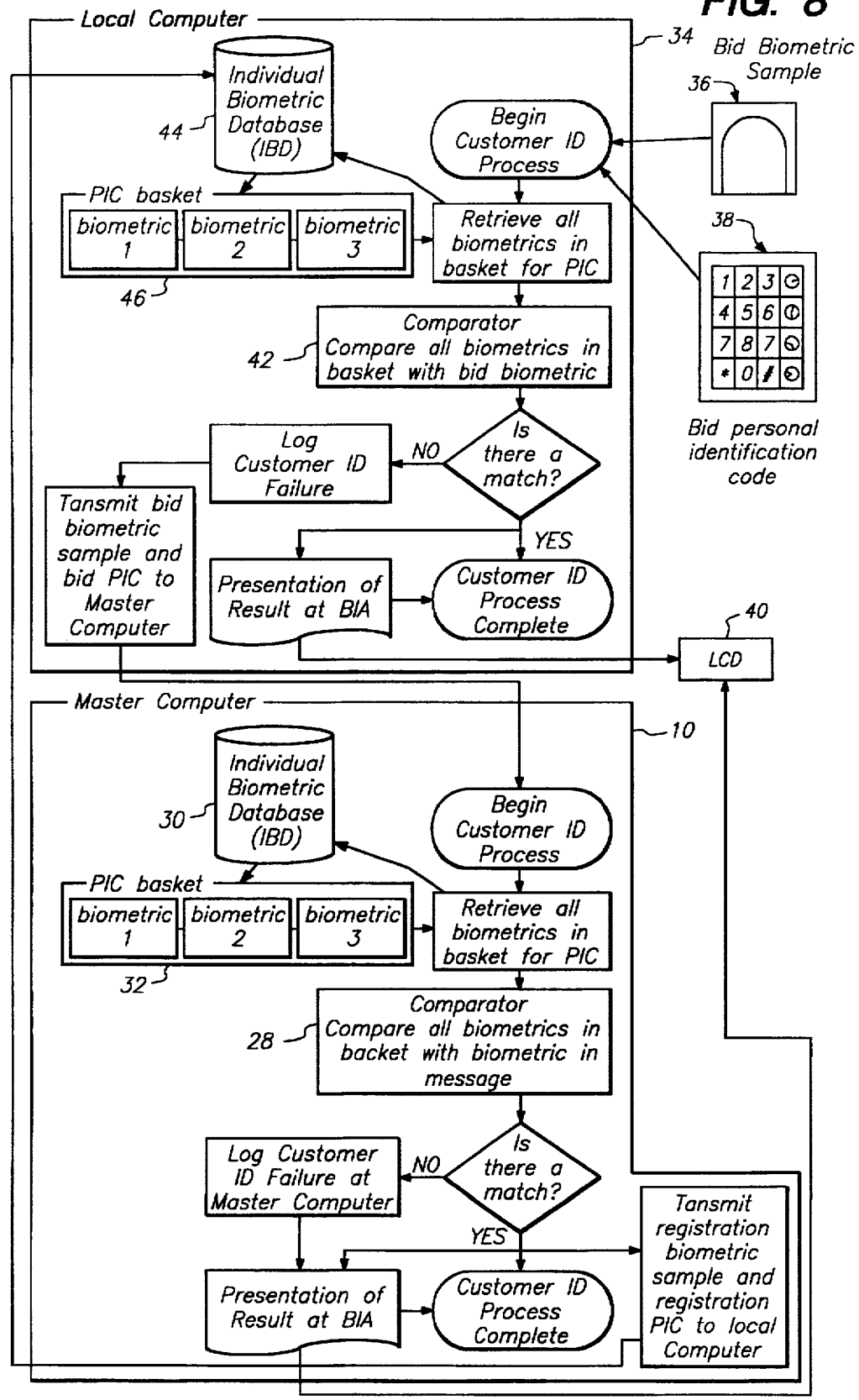
FIG. 8 is a flow chart representing the process of identification of an individual and transfer of biometric sample and personal identification code to a local computer, in a first embodiment of the invention.

FIG. 8 shows the identification process at the local computer 34 and master computer 10 after receiving the identification request message from the biometric input apparatus 15. When the user enters their bid biometric sample and bid personal identification code into a first biometric input apparatus 15, the bid biometric sample and bid personal identification code are transmitted to a first local computer 34. The first local computer comparator 42 compares the bid biometric sample and bid personal identification code against the subset of biometric samples 46 and personal identification codes 44 contained in the first local computer database to produce either a failed or successful first identification result. If the first local computer returns a failed first identification result, the bid biometric sample and bid personal identification code are transmitted to the master computer 10 for comparison of the entered bid biometric sample and bid personal identification code to personal identification codes 30 and biometric samples 32 stored in the master computer 10 to produce either a failed or successful second identification result. The result of the first or second identification result is externalized from the identification computer system preferably to the user by a display unit 40.

If the user individual is not identified by the local computer, and the master computer was able to produce a successful second identification result, then the master computer transmits the identified registered biometric sample and registered personal identification code to the particular local computer which requested the identification, for storage.

In a preferred embodiment, upon expiration of a previously determined time period from the most recent identification of an individual, the biometric sample and personal identification code of that user is purged from the local computer database. However, the user's biometric sample and personal identification code is not automatically removed or purged from the master computer databases 30 and 32. This frees database space on local computer database 46 as well as reduces the number of biometric comparisons the local computer comparator 34 has to perform for making an identification result. The user's biometric sample and personal identification code, however, are stored with the master computer 10 for future identification requests made by local computers 34 who have previously purged biometric samples and personal identification code of the user from their database, or those local computers who had never contained the biometric sample and personal identification code of that specific user on their database.

Therefore, should a user use the identification computer system more often than the designated purge time period, their biometric comparisons can be had far more quickly, because their biometric sample and personal identification code remains on the local computer database.

Figure 9:
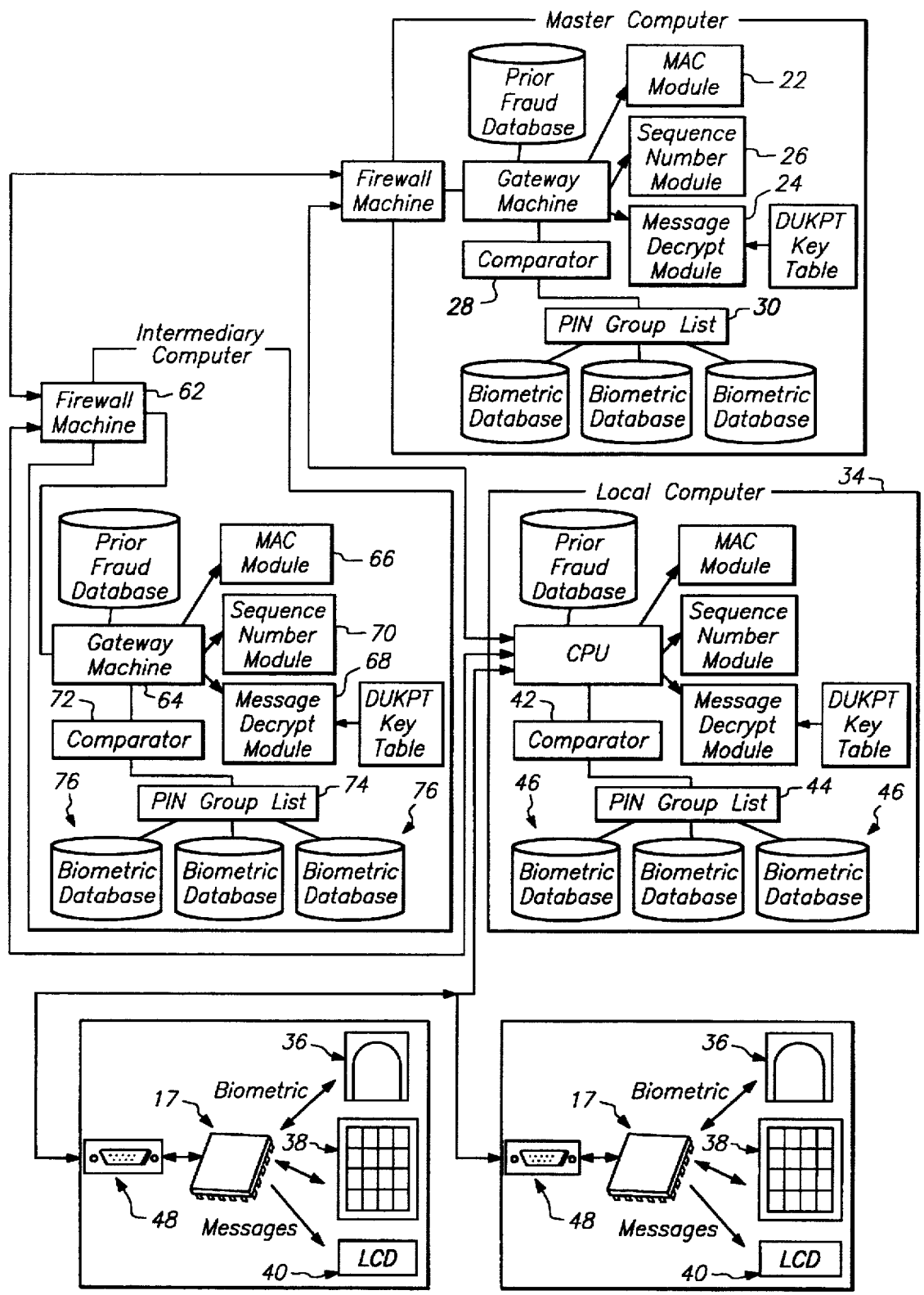
FIG. 9 is a diagram representing a second embodiment of the invention.

FIG. 9 shows representational diagram of another configuration of the identification computer system. Although this FIG. 9 shows only one intermediary computer, this embodiment employs at least two intermediary computers 60 which are functionally placed between the local computers 34 and master computer 10. The internal structure of the intermediary computer 60 is much like the master computer 10. Intermediary computers 60 comprise of several data bases and software execution modules. The Intermediary computers 60 each have Firewall Machine 62 which is responsible for prevention of electronic intrusion of the system. The Gateway Machine 64 carries out all requests from the user, including adding, deleting and otherwise modifying all data bases. The Gateway Machine is also responsible for decryption and de-packaging of data that has arrived from the terminals using the MACM module 66, MDM module 68, and the Serial Number module 70. Intermediary computer comparator 72 uses the personal identification code group list module 74, and the biometric sample databases 76 are used to locate the proper personal identification code and biometrics sample basket. Various configurations of this embodiment are shown in FIG. 10B.

When a user's bid biometric sample and bid personal identification code are submitted to a first local computer 34, the first local computer comparator 42 compares the bid biometric sample and bid personal identification code with the subset of the biometric samples and personal identification codes registered and contained in the first local computer as shown in FIG. 8, for producing either a failed or successful first identification result. If the first local computer returns a failed identification result, the bid biometric sample and bid personal identification code are transmitted to the intermediary computer 60 it is connected to, for comparison of the entered bid biometric sample and bid personal identification code to personal identification codes and biometric samples stored in the intermediary computer for producing either a failed or successful second identification result. The methods employed by the intermediary computer to produce an identification result is the same as that described for the master computer and shown in FIG. 8. If the intermediary computer returns a failed second identification result, the bid biometric sample and bid personal identification code are transmitted to the master computer 10 for comparison of the entered bid biometric sample and bid personal identification code to personal identification codes and biometric samples stored in the master computer 10 for producing either a failed or successful third identification result. Finally, the first, second or third identification result is externalized from the identification computer system using a display unit.

Each local computer 34 communicates with only one intermediary computer 60. Use sensitivity is achieved in this configuration in that the frequent user of a particular local computer 34 normally has their registered biometric sample and personal identification code contained in the database of a local computer most likely within the physical area that this particular individual lives in. Should this individual for example, relocate to another area of the country, the first time that this individual attempts to be identified in a new local computer, the identification process will take longer because the local computer database will not have this individual's biometric samples. The local computer must communicate with the intermediary computer 60 that it is connected to, and the biometric samples must be retrieved from either the intermediary computer 60 or the master computer 10. After this first identification, future biometric identifications occur more quickly because the biometric sample and personal identification code of the user will have been transferred to and stored on the local computer's database. Additionally, the local computer which the individual used prior to relocating, will eventually purge from its records the biometric sample and personal identification code of the relocated individual user, freeing up database space as well as speeding up biometric comparisons for other users of the old local computer.

Figure 10A:
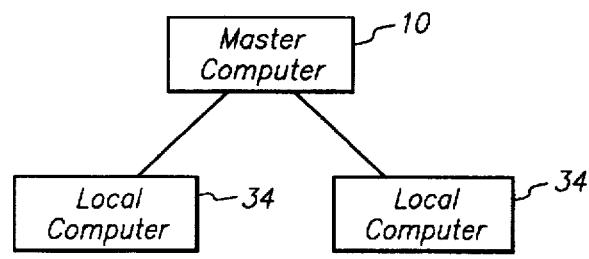
FIGS. 10A–10C are diagrams of various embodiments of the invention.
Figure 10B:
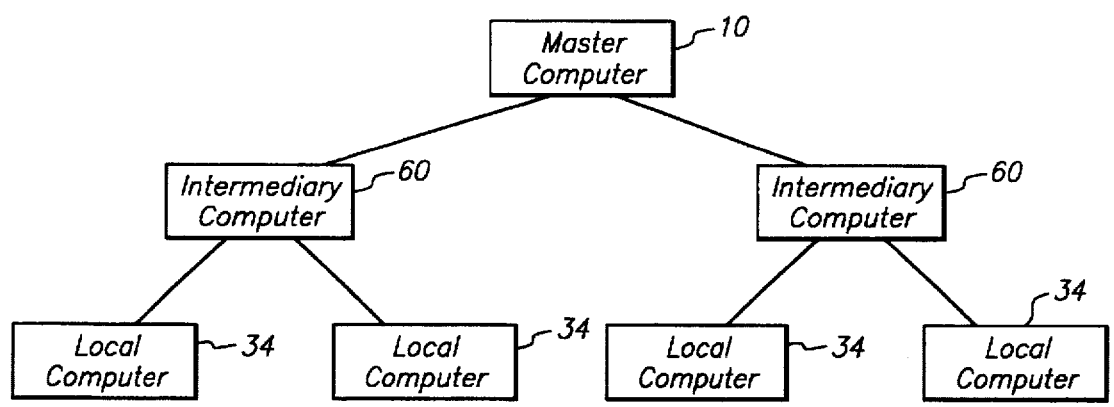
Figure 10C:
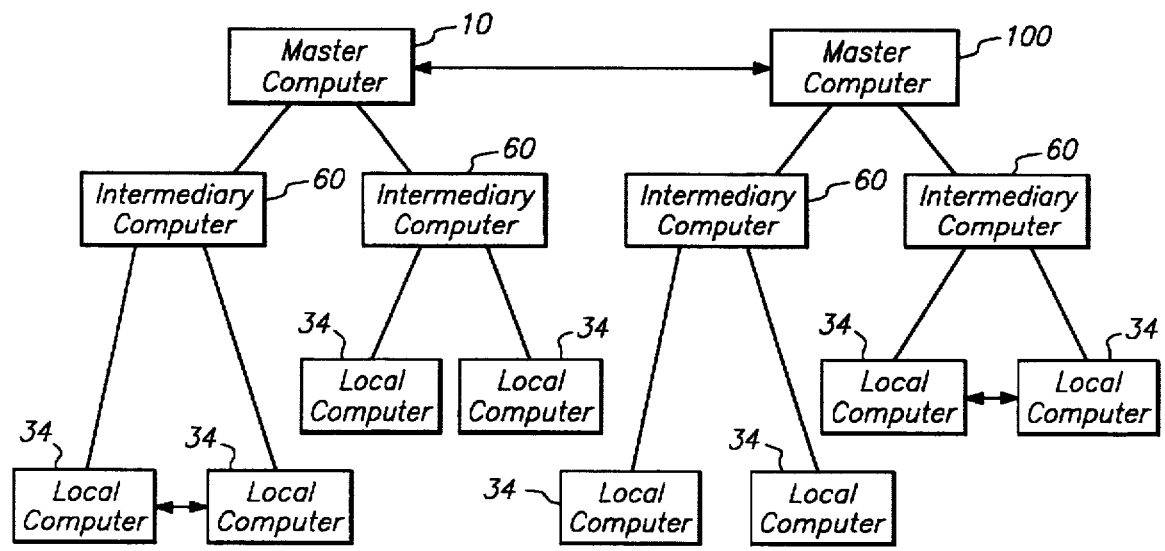

FIGS. 10A–10C show the various embodiments of the identification computer system. FIG. 10C in particular shows an embodiment where there are at least two master computers 10 and 100. The structure and components of the master computers in this configuration are the same as the master computer in the previous configurations. Each master computer contains a different set of biometric samples and personal identification codes registered with the identification computer system. The master computers 10 and 100 are connected to or otherwise communicate with intermediary computers 60 which in turn communicate with local computers 34. Alternatively, the at least two master computers 10 and 100 communicate with local computers 34 directly. Preferably, each intermediary computer communicates with only one master computer. The structure and components of the intermediary and local computers in this configuration is the same as the previous configurations discussed above.

In an embodiment designated as FIG. 10C, when the user enters their registered bid biometric sample and bid personal identification code into a first local computer 34, the first local computer comparator 42 compares the bid biometric sample and bid personal identification code with biometric samples and personal identification codes contained in a first local computer for producing either a failed or successful first identification result. If the first local computer returns a failed identification result, the bid biometric sample and bid personal identification code are transmitted to a first master computer 10 for comparison of the entered bid biometric sample and bid personal identification code to personal identification codes and biometric samples stored in the first master computer for producing either a failed or successful second identification result. If the first master computer 10 returns a failed identification result, the first master computer transmits the bid identification code and bid biometric sample to at least one second master computer 100 for comparison of the bid biometric sample and bid personal identification code to the biometric samples and personal identification codes stored in the second master computer for producing a failed or successful third identification result. The result of the first, second, or third identification result is externalized to a display unit. Alternatively, prior to transmission of the bid biometric sample and personal identification code from the local computer 34 to the master computer 10 the bid biometric sample and the bid personal identification code are transmitted to an intermediary computer 60.

It is understood that the same identification procedures and apparatus previously discussed applies to this embodiment of the invention and for transfer of registered biometric sample and personal identification codes from the master or intermediary computers to the local computer. Additionally, the registered biometric sample and personal identification codes are purged from local computer database which are no longer used by the individual.

Biometric Input Apparatus (BIA)

The biometric input apparatus or device is a combination of hardware and software whose job it is to gather biometric samples from individuals, either for registration of the individual user's biometric sample with the computer identification system or subsequently, for comparison of a bid biometric sample to a previously registered sample.

Preferably, the biometric input apparatus is constructed in a manner which makes it difficult to tamper with the contents. In a preferred embodiment, each biometric input means has a hardware identification code previously registered with the master computer, which makes the biometric input means uniquely identifiable to the master computer in each subsequent transmission from that biometric input device.

Depending on the task at hand, BIA models are either partially or fully integrated with a terminal. Partially integrated devices are physically separate from the terminal, and they include wireless and standard retail point of sale BIAs. Fully integrated devices are contained within the physical enclosure of the terminal itself, for instance, an ATM, or a telephone.

DES Encryption Library

There are any number of DES implementations publicly available. DES implementations provide a secret key-based encryption from plaintext to ciphertext, and decryption from ciphertext to plaintext, using 56-bit secret keys.

Public Key Encryption Library

Public Key encryption support libraries are available from Public Key Partners, holders of the RSA public key patent (known in the industry). Public Key cryptosystems are asymmetric encryption systems that allow communication to take place without requiring a costly exchange of secret keys. To use a public key encryption system, a public key is used to encrypt a DES key, and then the DES key is used to encrypt a message. The BIA uses public key cryptosystems to provide for the secure exchange of secret keys.

DUKPT Key Management Library

The derived unique key per transaction key (DUKPT) management library is used to create future DES keys given an initial key and a message sequence number. Future keys are stored in a Future Key Table. Once used, a given key is cleared from the table. Initial keys are only used to generate the initial future key table. Therefore the initial key is not stored by the BIA The use of DUKPT is designed to create a key management mechanism that provided a different DES key for each transaction, without leaving behind the trace of the initial key. The implications of this are that even successful capture and dissection of a given future key table does not reveal messages that were previously sent, a very important goal when the effective lifetime of the information transmitted is decades. DUKPT is fully specified in ANSI X9.24 (known in the industry).

Terminals

The terminal is the device that controls the biometric input apparatus and connects to the local computer via modem, X.25 connection, or Internet connection methods well-known to the industry. Terminals come in different shapes and sizes, and require different versions of the BIA to perform their tasks. Any electronic device, such as a computer, Automated teller machine, cash register, facsimile machine, telephone, or wireless remote control, which issues commands to and receives results from the biometric input device, can be a terminal.

Some terminals are application programs that run on a general purpose microcomputer, while other terminals are combinations of special purpose hardware and software. While the terminal is critical for the functioning of the system as a whole, the system itself places no trust in the terminal whatsoever. Whenever a terminal provides information to the system, the system always validates it in some manner, either through presentation to the individual for confirmation, or by cross-checking through other previously registered information.

While terminals are able to read some parts of BIA messages in order to validate that the data was processed properly by the BIA, terminals cannot read biometric identification information including the biometric, the PIC, encryption keys or financial account information. Specific BIAs export some security functionality to the terminal, such as PIC entry, and private code display.

Master, Intermediary, and Local Computers

The master computer is responsible for storage of the entire set of biometric samples registered with the computer system. Each master computer site is preferably made up of a number of computers and databases connected together over a LAN (local-area network) as illustrated in the master computer overview FIG. 2. Multiple identical master computer sites ensure reliable service in the face of disaster or serious hardware failure at any single master computer site. Furthermore, each master, intermediary, and local computer site has electrical power backup and multiple redundancy in all of its critical hardware and database systems.

It is preferred that the local, master and intermediary computers have a firewall machine which is the entry point of data and messages in into these computers, and a gateway machine which is a system coordinator and message processor. It is understood that user's biometrics and other sensitive data are stored in the various computer databases and state of the art methods and apparatus should be employed to protect these data from theft.

Comparator

For identification requests that require the master, intermediary, or local computer to identify an individual, each of the indicated computers use the bid personal identification code to search the personal identification code group list.

The computer retrieves all the individual biometric database records from the biometric basket indexed and identified by the personal identification group list for the submitted bid personal identification code. The comparator then compares each biometric sample contained in the biometric basket to the user's bid biometric sample. Preferably, if no biometric has a close enough comparison score, the comparisons are repeated using any secondary biometrics. If none of the secondary biometrics have a close enough comparison score, then the computer comparator returns a failed identification result. Otherwise, the full individual biometric database record of the individual is retrieved in a successful identification result, from which the individual's private code, financial account information, titles, and other data are accessed.

For identification of users in a system with a large number of registrants, which causes commercially unacceptable identification time delays, an embodiment of the invention requires non-unique personal identification codes.

For identification of users in an alternative embodiment, the personal identification code can be unique to the user. In this embodiment, only biometric samples from a single individual is stored in each biometric basket.

Registration

Individuals register with the master computer via a biometric input apparatus. The biometric input apparatus transmits to the master computer, either directly or through the local or intermediary computer, a registration packet containing the individual's primary and secondary biometrics and personal identification code of an individual. In other embodiments other ancillary data such as the individual's name, address, a list of financial asset accounts, the private code, and the emergency account is appended. Optionally, the individual may include an electronic mail address, and a title list including titles and the title index code, as well as a social security number (or "SSN"). The individual may choose his or her own personal identification code or allow the system to choose it.

In the embodiments of the invention utilizing only one master computer, only one master computer site acts as the registration site. Registration requests received by a non-registration computer are forwarded to the master computer. The registration master computer performs the entire registration check, assigning of individual biometric database records to personal identification group list.

The registration master computer site selects the PIC code for registration requests that don't specify one, stores the IBD record on the main and backup individual biometric database (as specified in the PIC Group List), and checks the PIC and biometric suitability of the registration packet.

The master computer runs a personal identification code and biometric sample duplication check step wherein the biometrics and personal identification code gathered during the registration step is checked against all previously registered biometrics currently associated with the identical personal identification code. The master computer may reject the registration for the following reasons: the biometric sample basket indexed by the personal identification code (PIC code) is too popular, or the biometrics are algorithmically indistinguishable from other biometrics stored under the chosen PIC. To aid the individual in choosing an acceptable PIC, the master computer generates a short list of PIC codes for which the registration will be guaranteed that it reserves for a period of time. The biometric input apparatus then prompts the individual for a new PIC which may be chosen from the master computer's PIC code list.

Firewall Machine

The FW Machines provide a first line of defense against network viruses and computer hackers. All communication links into or out of the master computer site first pass through a secure FW Machine. The FW Machine, an internet-localnet router, only handles messages destined for the GM Machines.

BIA-equipped terminals send packets to a single master computer site via modem, X.25, or other communication medium. The master computer relies on a third party to supply the modem banks required to handle the volume of calls and feed the data onto the master computer backbone.

For master computer to master computer communication, primarily for distributed transactions and sequence number updates, the FW Machines send out double-length DES encrypted packets. The master computer LAN component handles the encryption and decryption: the FWs do not have the ability to decrypt the packets.

A properly configured network sniffer acts as an intruder detector as backup for the FW. If an anomalous message is detected, the intruding messages are recorded in their entirety, an operator is alerted, and the FW is physically shut down by the sniffer. The FW disallows any transmissions from the internal network to the rest of the Internet.

Gateway Machine

The GM Machine (GM), through the FW Machines, link the outside world (BIA-equipped terminals and other master computers) to the internal components of the master computer. The master computer has multiple GMs. The GM supervises the processing of each BIA identification request, communicates with the various master computer components as necessary, is responsible for directing the purge engine or otherwise modification of the computer's database, and sends the encrypted results of the request back to the sender. The software performing this task is called the Message Processing Module.

The GM logs all requests it receives and any warnings from components it communicates with. For example, the GM logs any emergency account accesses, sequence number gaps, and invalid packets. Processing a request may require the GM to inform GMs at all other master computers of a change in the master computer databases. When this happens, the GM runs a distributed transaction to update the remote databases.

Distributed transactions fall into two categories: synchronous and asynchronous. Synchronous distributed transactions require the GM to wait for the distributed transaction to commit before continuing to process the packet. Asynchronous distributed transactions do not require the GM to wait for the commit, and allow it to finish processing the request regardless of whether the distributed transaction commits or not. Asynchronous distributed transactions are only used to update data for which database consistency is not an absolute requirement: sequence numbers and biometric checksum recordings may be performed asynchronously, whereas creating database records, such as Individual Biometric records, may not.

When executing a synchronous distributed transaction, the requesting GM only considers the entire transaction successful if all sites can successfully commit the transaction locally. Otherwise, the GMs back out the changes locally and reject the request due to a transaction error.

Master Computer LAN

The master computer Local Area Network (LAN) links the machines of the master computer sites together using a fiber optic token ring. The fiber optic token ring provides both high bandwidth and good physical security.

The network interfaces used by the machines on the master computer LAN include encryption hardware to make tapping or intercepting packets useless without the encryption key. The encryption key is the same for all machines on the LAN and is stored . in the encryption hardware. A properly configured network sniffer acts as an intruder detector as backup for the FW. If an anomalous message is detected, the intruding messages are recorded in their entirety, an operator is alerted, and the FW is physically shut down by the sniffer.

PIC Group List

The PIC Group List (PGL), defines the configuration of the IBD database. The PGL stores a list of the PIC groups in the system which is used to simplify the management of the PICs. A PIC group is a set of consecutive PIC codes. A PGL exists on each GM Machine (GM) or other CPU.

The PGL, when given a PIC code, searches through its list of PIC groups for the group containing the PIC code. The PGL maintains the list of groups in order and uses a binary search to quickly find the correct group. The initial configuration for the PGL is one giant PIC group containing all possible PICs. After a threshold number of PICs are assigned, the giant PIC group is split in two. Thereafter, this process is applied to all succeeding PIC groups.

When a PIC group splits, the PGL assigns a new main and backup IBD database based on available storage on a first-come-first serve basis. The PGL coordinates with the IBD database to first copy the affected records from the old main and backup machines to the new ones, and last remove the old main and backup copies. Splitting a PIC group is an involved task. The PGL batches split requests to be run when the master computer is lightly loaded, for instance, at night.

The system administrator may also change the main and backup IBD database for a given PIC group if the machines' free storage falls below a level required for handling the expected amount of new registrations.

Each PIC group is identified by a unique identifier. For convenience the PIC group identification code is the lowPin code for the group, however the system does not otherwise rely upon this fact. When PIC groups are added, merged, or split up, the PGL is responsible for informing the IBD database of the changes and for directing the movement of IBD records from one IBD database to another.

Individual Biometric Database

Individual Biometric Database (IBD) records store information on individuals, including their primary and secondary biometrics, PIC code, list of financial asset accounts, private code, emergency account, address, and phone number. The individual may optionally include their SSN and electronic mail address. This information is necessary for identifying an individual either by biometric or personal information, for accessing account information, or for providing an address or phone number to remote merchants for additional verification.

Individuals are added to the system during the individual enrollment process at any designated biometric input apparatus. During enrollment, individuals select their personal identification numbers, and add financial asset accounts to their biometric and PIC combination.

Individuals may be removed from the database due to fraudulent activity reported by any issuing member. If this occurs, the individual's account information is moved from the IBD to the Prior Fraud Database (PFD) by an authorized internal systems representative. The biometric samples in the PFD may not be used for records in the IBD.

The IBD preferably exists on multiple machines, each of which is responsible for a subset of the IBD records with a copy of each record stored on two different database, both for redundancy and for load-sharing. The individual biometric database, and PIC Group List remain up-to-date in terms of which PICs are on which database. When a PIC group is reconfigured or main and backup machines for PIC groups are changed, the IBD database are updated and indexed appropriately.

Prior Fraud Database

The Prior Fraud Database (PFD) is a collection of records representing individuals who have defrauded member issuers at some point in the past. The PFD also runs background transactions during periods of low system activity to locate individuals in the IBD who have matching records in the PFD. The system does not automatically put individuals in the PFD, unless it detects that they are attempting to register again.

Before a new IBD record is marked as active, the individual's primary and secondary biometrics are checked against each and every biometric in the PFD using the same biometric comparison techniques as those used in the individual identification procedure. It is also possible to make pure biometric comparisons, biometric comparisons without the aid of a personal identification code, for a submitted biometric sample against the library of registered biometric samples in either the local, intermediary or master computers, in periods of low activity. If a match is found for the new IBD record, the IBD record's status is set to "prior fraud". If the prior fraud check was executed as part of a registration request, the GM logs a "registering individual with prior fraud" warning.

It is assumed that the PFD will remain relatively small. The cost to run the PFD is expensive, as it is an involuntary biometric search, so it is important to add only those individuals to the PFD who have imposed a significant cost to the system.

The PFD record is the same as the IBD record. Fortunately, the master computer needs to store a lot less of them so only two database machines are required to store the entire database, of which one is the backup. The PFD does not have any direct dependencies on any other master computer component.

From the foregoing, it will be appreciated how the objects and features of the invention are met.

First, the invention provides a computer identification system that eliminates the need for a user to possess and present a physical object, such as a token, in order to initiate a system access request. Second, the invention provides a computer identification system that is capable of verifying a user's identity, as opposed to verifying possession of proprietary objects and information. Third, the invention verifies the user's identity based upon one or more unique characteristics physically personal to the user. Fourth, the invention provides a system of secured access to a computer system that is highly resistant to fraudulent access attempts by non-authorized users. Fifth, the invention provides an identification system that allows for identification of the sender and recipient of an electronic message and/or facsimile.

Although the invention has been described with respect to a particular identification system and method for its use describing financial transactions, it is understood that once an identification is made using the invention, other applications of the system include authorized access to locations, data, machines, e-mail systems and the like. It will be appreciated that various modifications of the apparatus and method are possible without departing from the invention, which is defined by the claims set forth below.

What is claimed is:

1. An identification computer system which is sensitive to use or decrease use, for determining an individual's identity from comparison of previously recorded biometric samples and personal identification codes with a bid biometric sample and a bid identification code, said system comprising:

a. a master computer further comprising a master computer comparator, a master comparator biometric database containing the biometric samples of all users registered with the identification computer system, and a user personal identification code group database containing the personal identification codes of said users;

b. at least two local computers, physically remote from each other, each local computer further comprising;
      i) a biometric scanner;
      ii) a local comparator;
      iii) a data entry device;
      iv) a local user biometric database containing a subset of the biometric samples contained in the master biomertic database; and
      v) a personal identification code database;

c. first interconnecting means for interconnecting each local computer to the master computer; wherein
      i) the user presents their bid biometric sample and bid personal identification code to a first local computer, the first local computer comparator compares the bid biometric sample and bid personal identification code with biometric samples and personal identification codes contained in the first local computer database to produce either a failed or successful first identification result;
      ii) wherein if the first local computer returns a failed identification result, the bid biometric sample and bid personal identification code are transmitted to the master computer for comparison of the entered bid biometric sample and bid personal identification code to personal identification codes and biometric samples stored in the master computer for producing either a failed or successful second identification result; and d. at least one display unit wherein said first or second identification result is externalized.

2. The system of claim 1 wherein upon return of a failed first identification result and return of a successful second identification result, the master computer transmits the biometric sample and personal identification code of the identified user to the first local computer.

3. The system of claim 1 wherein the personal identification code and biometric sample of a user is deleted from the local computer biometric databases if there has been no attempt to identify an individual upon expiration of a predetermined time limit.

4. The system of claim 1, the at least two local computer further comprises:

a. at least one terminal apparatus that is functionally partially or fully integrated with the biometric scanner;

b. at least one code entry pad; and c. second interconnecting means for interconnecting said biometric scanner, terminal apparatus and said code entry pad.

5. The system of claim 1 further comprising encryption and decryption means, wherein communications between the master computer and local computer are encrypted.

6. The system of claim 1 further comprising third interconnecting means for interconnecting the local computer to each other.

7. The system of claim 6 wherein the local computers have a different subset of biometric samples and personal identifications codes from each other and from the master computer.

8. The system of claim 6 wherein the first and third interconnecting means is one or more of the group comprising an ATM network, the Internet, a private intranet, a telephone network, or a cable TV network.

9. The system of claim 1 further comprising a fraud detector module further comprising a fraud biometric comparator and fraud biometric data boacs containing a subset of the biometric samples stored in the master computer.

10. The system of claim 1 further comprising means for purging biometric samples and personal identification codes from the master computer and local computer databases.

11. The system of claim 1 further comprising a computer system authenticator wherein a private code, distinet from the personal identification code and not used to gain access to the computer system, is previously gathered from the user and recorded in the master computer data bases, and is presented to only the user after an identification attempt, whereby the user is assured that the authentic computer system was used To process the account access because a false computer system would not be able to present the customer's private code.

12. The system of claim 1 wherein the personal identification code is not unique to the user in that biometric samples from different individuals are stored in the same biometric basket.

13. An identification computer system for determining an individual's identity from comparison of previously registered biometric samples and personal identification codes with a bid biometric sample and a bid identification code, and sensitive to use or decrease use, said system comprising;

a. a master computer further having a master computer comparator, a master user biometric database containing the biometric samples of all users registered with the computer system, and a user personal identification code group database containing the personal identification codes of said users; wherein the personal identification codes of users are not unique to each user;

b. at least two local computers, physically remote from each other, each local computer further comprising;
  i) a biometric scanner;
  ii) a local comparator;
  iii) a data entry device;
  iv) a local user biometric database containing a subset of the biometric samples contained in the master biomertic database; and
  v) a personal identification code database;

c. at least two intermediary computers, each having an intermediary computer comparator, intermediary computer user biometric sample database containing a subset of biometric samples of the master computer biometric sample database, and a different subset of biometric sample database contained in the local computer biometric sample database, and a user personal identification code group database containing the personal identification codes of said users; wherein the personal identification codes of users are not unique to each user;

d. first interconnecting means for interconnecting each local computer with only one intermediary computer, and second interconnecting means for interconnecting each intermediary computer to the master computer; wherein
  i) the user enters their bid biometric sample and bid personal identification code into a first local computer, the first local computer comparator compares the bid biometric sample and bid personal identification code with registered biometric samples and personal identification codes contained in the first local computer for producing either a failed or successful first identification result;
  ii) wherein if the first local computer returns a failed identification result, the bid biometric sample and bid personal identification code are transmitted to the intermediary computer it is connected to, for comparison of the entered bid biometric sample and bid personal identification code to personal identification codes and biometric samples stored in the intermediary computer for producing either a failed or successful second identification result;
  iii) wherein if the intermediary computer returns a failed identification result, the bid biometric sample and bid personal identification code are transmitted to the master computer for comparison of the entered bid biometric sample and bid personal identification code to personal identification codes and biometric samples stored in the master computer for producing either a failed or successful third identification result; and e. at least one display unit wherein said first, second or third identification result is externalized.

14. The system of claim 13 wherein upon return of a failed first and second identification results, and upon return of a successful third identification result, the master computer transmits the biometric sample and personal identification code of the identified user to the intermediary computer for storage, and wherein, the intermediary computer transmits the biometric sample and personal identification code of the identified user to the local computer.

15. A tokenless method for rapid search of previously stored biometric samples from individuals using at least two biometric baskets, at least one biometric basket containing at least two algorithmically unique biometric samples from different individuals, each biometric basket containing less than the total number of samples registered with the system, and each biometric basket being identified by a personal identification code, the method comprising;

a. a storage step further comprising:
  i. gathering a biometric sample from an individual;
  ii. selecting a personal identification code that indexes a biometric basket;
  iii. locating the biometric basket identified by the personal identification code;
  iv. comparing the biometric sample gathered from said individual, with all previously stored biometric samples in the biometric basket, to make sure that the biometric sample gathered from the individual is algorithmically unique from all biometric samples currently stored in said biometric basket for producing a successful or failed uniqueness result; and
  v. upon return of a successful uniqueness result, storing of the entered biometric sample gathered from said individual in the selected biometric basket; and b. a bid step further comprising:
  i. entering a bid personal identification code by a candidate individual;
  ii. entering a bid biometric sample by said candidate individual; and;
c. a comparison step further comprising:
  i. locating the biometric basket that is identified by the bid personal identification code entered by said candidate individual; and
  ii. comparison of the bid biometric sample from said candidate individual with all of the biometric samples stored in the identified biometric basket for producing either a successful or failed identification result.

16. An identification computer system sensitive to use, for determining a user's identity from comparison of previously stored biometric samples and personal identification codes with a bid biometric sample and a bid identification code, said system comprising:
  a. at least two master computers each having a master computer comparator and data bases, wherein each master computer contains a different subset of all biometric samples and personal identification codes of users registered with the identification computer system;
  b. at least two local computers, physically remote from each other,
    i. each local computers connected through a first interconnecting means to only one master computer,
    ii. each local computer containing a subset of the biometric samples and personal identification codes contained in the at least two master computers, and
    iii. each local computer having a local comparator;
  c. second interconnecting means for interconnecting the at least two master computers to each other; wherein
    i) the user enters their registered bid biometric sample and bid personal identification code into a first local computer, the first local computer comparator compares the bid biometric sample and bid personal identification code with biometric samples and personal identification codes contained in the first local computer for producing either a failed or successful first identification result;
    ii) wherein if the first local computer returns a failed identification result, the bid biometric sample and bid personal identification code are transmitted to a first master computer for comparison of the entered bid biometric sample and bid personal identification code to personal identification codes and biometric samples stored in the first master computer for producing either a failed or successful second identification result;
    iii) wherein if the first master computer returns a failed identification result, the first master computer transmits the bid identification code and bid biometric sample to at least one second master computer for comparison of the bid biometric sample and bid personal identification code to biometric samples and personal identification codes stored in the second master computer for producing a failed or successful third identification result; and
  d. at least one display unit wherein said identification result is externalized.

17. The system of claim 16 wherein upon return of a failed first and second identification results, and upon return of a successful third identification result, the second master computer transmits the biometric sample and personal identification code of the identified user to the first master computer for storage, thereafter, the first master computer transmits the biometric sample and personal identification code of the identified user to The first local computer.

18. The system of claim 16, the at least two master computers each further comprising a purge engine.

19. The system of claim 18, wherein after the second master computer transmits the biometric sample and personal identification code of the identified user to the first master computer, the second master computer purges the biometric sample and personal identification code of the identified user from its data bases.

20. The system of claim 18, wherein after the second master computer transmits the biometric sample and personal identification code of the identified user to the first master computer, the second master computer purges the biometric sample and personal identification code of the identified user from the intermediary computer it is connected to.

21. The system of claim 18 wherein the purge engine deletes the biometric sample and personal identification code of any user from the first local computer upon expiration of a predetermined time limit.

* * * * *